US009880527B2

(12) United States Patent
Li et al.

(10) Patent No.: US 9,880,527 B2
(45) Date of Patent: Jan. 30, 2018

(54) MULTIVARIABLE FEEDFORWARD CONTROL

(71) Applicant: General Electric Company, Schenectady, NY (US)

(72) Inventors: Guoxin Li, Cincinnati, OH (US); R. Sheldon Carpenter, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 227 days.

(21) Appl. No.: 14/750,330

(22) Filed: Jun. 25, 2015

(65) Prior Publication Data

US 2015/0378327 A1    Dec. 31, 2015

Related U.S. Application Data

(60) Provisional application No. 62/019,268, filed on Jun. 30, 2014.

(51) Int. Cl.
| | |
|---|---|
| *G05B 13/02* | (2006.01) |
| *F02C 9/28* | (2006.01) |
| *F01D 17/06* | (2006.01) |
| *F01D 17/08* | (2006.01) |

(52) U.S. Cl.
CPC .............. *G05B 13/026* (2013.01); *F02C 9/28* (2013.01); *F01D 17/06* (2013.01); *F01D 17/085* (2013.01); *F05D 2220/32* (2013.01); *F05D 2240/24* (2013.01); *F05D 2260/80* (2013.01); *F05D 2270/03* (2013.01); *F05D 2270/301* (2013.01); *F05D 2270/44* (2013.01)

(58) Field of Classification Search
None
See application file for complete search history.

(56) References Cited

U.S. PATENT DOCUMENTS

| | | | |
|---|---|---|---|
| 5,361,579 A | 11/1994 | Bachelder | |
| 5,488,561 A | 1/1996 | Berkowitz et al. | |
| 6,823,253 B2 * | 11/2004 | Brunell | G05B 13/048 |
| | | | 700/30 |

(Continued)

FOREIGN PATENT DOCUMENTS

CN       101326343 A    12/2008

OTHER PUBLICATIONS

Chiu, "Mixed Feedforward/Feedback Based Adaptive Fuzzy control for a class of MIMO Nonlinear Systems", Dec. 2006, IEEE transactions on Fuzzy systems, vol. 14 No. 6, pp. 716-727.*

(Continued)

*Primary Examiner* — Jason Lin
(74) *Attorney, Agent, or Firm* — General Electric Company; Pamela A. Kachur

(57) ABSTRACT

A method of tracking variable states of a gas turbine engine in transient conditions includes obtaining input data representative of rotor velocity and pressure ratio; calculating a reference transient scheduled trajectory based on the input data; calculating a speed reference transient scheduled trajectory based on the input data; calculating a feedforward variable based on the reference transient scheduled trajectory; obtaining a feedback control variable; and determining a control variable based on a combination of the feedforward variable and the feedback control variable.

6 Claims, 3 Drawing Sheets

(56) References Cited

U.S. PATENT DOCUMENTS

| | | |
|---|---|---|
| 6,882,889 B2 | 4/2005 | Fuller et al. |
| 7,752,833 B2 | 7/2010 | Feiz |
| 7,930,045 B2 | 4/2011 | Cheng |
| 2004/0123600 A1* | 7/2004 | Brunell .................... F02C 9/00 60/773 |
| 2007/0156259 A1* | 7/2007 | Baramov ............. G05B 13/048 700/44 |
| 2007/0283695 A1 | 12/2007 | Figura |
| 2008/0221710 A1 | 9/2008 | Brunell |
| 2009/0005886 A1* | 1/2009 | Gao ........................ G05B 5/01 700/29 |
| 2009/0143871 A1* | 6/2009 | Gao ...................... G05B 13/04 700/29 |
| 2010/0292937 A1* | 11/2010 | Hosny ..................... F02C 6/12 702/34 |
| 2012/0024270 A1 | 2/2012 | Wang et al. |

OTHER PUBLICATIONS

European Search Report and Opinion issued in connection with corresponding EP Application No. 15174358.0 dated Nov. 18, 2015.
Machine Translation of First Office Action and Search issued in connection with corresponding CN Application No. 201510581465.5 dated Sep. 25, 2017.

* cited by examiner

MULTIVARIABLE FEEDFORWARD CONTROL

CROSS-REFERENCE TO RELATED APPLICATIONS

This non-provisional application claims the benefit of priority under 35 U.S.C. § 119(e) to U.S. Provisional Patent Application No. 62/019,268, entitled "MULTIVARIABLE FEEDFORWARD CONTROL", filed Jun. 30, 2014, which is herein incorporated in its entirety by reference.

BACKGROUND

The technology described herein relates generally to gas turbine engines and more particularly to the control of gas turbine engines for aircraft.

For recent turbofan engines, pressure ratios act as a control parameter to achieve optimal performance and operability. However, pressure ratio tracking with a multivariable or multi-input, multi-output (MIMO) system using a feedback loop may result in undesirable levels of error, limiting the performance of the control system, in particular, in fast transient cases. Solutions to mitigate the effect of the tracking error typically include additional logical and heuristic processes that augment the basic feedback system during transient operation. That is, conventional tracking systems override the MIMO feedback model with additional control schemes based on measurements of how much the reference is changing to account for a fundamental mischaracterization of the underlying system. Essentially, the current solutions for control systems for turbine engines acknowledge the shortcomings of the feedback multivariable system, but do not address the problem directly.

Accordingly, it would be desirable to develop a control system for gas turbine engines that consistently tracks input and output variable states for both small and large transient conditions.

BRIEF DESCRIPTION OF THE INVENTION

A method of tracking variable states of a gas turbine engine in transient conditions includes obtaining input data representative of rotor velocity and pressure ratio; calculating a reference transient scheduled trajectory based on the input data; calculating a speed reference transient scheduled trajectory based on the input data; calculating a feedforward variable based on the reference transient scheduled trajectory; obtaining a feedback control variable; and determining a control variable based on a combination of the feedforward variable and the feedback control variable.

BRIEF DESCRIPTION OF THE DRAWINGS

The technology described herein may be best understood by reference to the following description taken in conjunction with the accompanying drawing figures in which.

DETAILED DESCRIPTION

Figure 1:
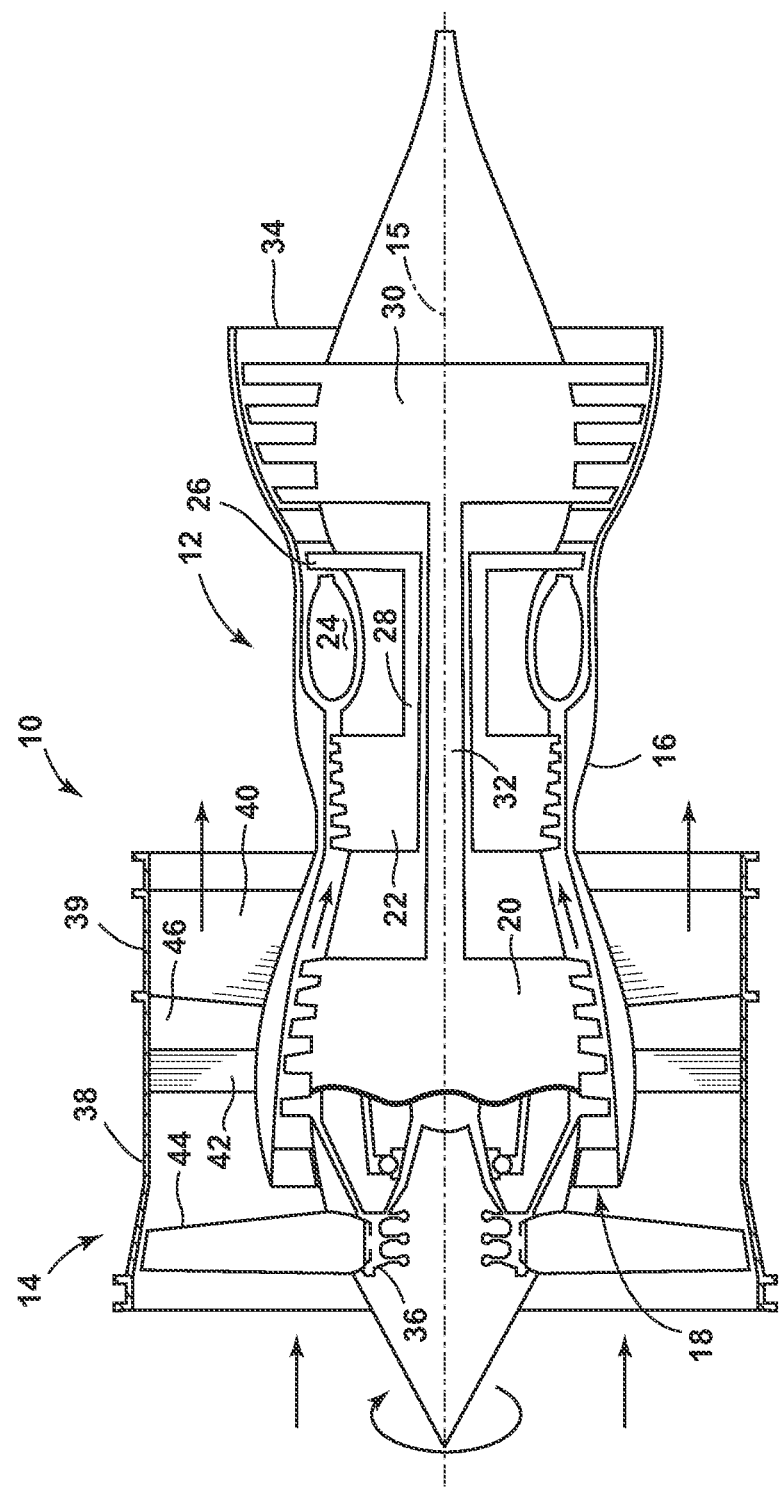
FIG. 1 is a schematic view of an exemplary gas turbine engine.

In the background and the following description, for the purposes of explanation, numerous specific details are set forth in order to provide a thorough understanding of the technology described herein. It will be evident to one skilled in the art, however, that the exemplary embodiments may be practiced without these specific details. In other instances, structures and devices are shown in diagram form in order to facilitate description of the exemplary embodiments.

The exemplary embodiments are described with reference to the drawings. These drawings illustrate certain details of specific embodiments that may implement a module, or method, or include one or more computer program products. However, the drawings should not be construed as imposing any limitations that may be present in the drawings. The method and any computer program product may be provided on any machine-readable media for accomplishing their operations. The embodiments may be implemented using an existing computer processor, or by a special purpose computer processor incorporated for this or another purpose, or by a hardwired system.

As noted above, embodiments described herein may include or utilize a computer program product comprising machine-readable media for carrying or having machine-executable instructions or data structures stored thereon. Such machine-readable media can be any available media, which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general purpose computer, special purpose computer, or special purpose processing machines to perform a certain function or group of functions.

Embodiments will be described in the general context of method steps that may be implemented in one embodiment by a program product including machine-executable instructions, such as program codes, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program codes for executing steps of the method disclosed herein. The particular sequence of such executable instructions or associated data structures represent examples of corresponding acts for implementing the functions described in such steps.

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the internet and may use a wide variety of different communication protocols. Those skilled in the art will appreciate that such network computing environments will typically encompass many types of computer system configurations, including personal computers, hand-held devices, multiprocessor systems, microprocessor-based or programmable consumer electronics, network PCs, minicomputers, mainframe computers, and the like.

Embodiments may also be practiced in distributed computing environments where tasks are performed by local and remote processing devices that are linked (either by hard-wired links, wireless links, or by a combination of hardwired or wireless links) through a communication network. In a distributed computing environment, program modules may be located in both local and remote memory storage devices.

An exemplary system for implementing the overall or portions of the exemplary embodiments might include a general purpose computing device in the form of a computer, including a processing unit, a system memory, and a system bus, that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

Technical effects of the method disclosed in the embodiments include improved tracking performance while maintaining an integrated multivariable feedback control gain, eliminating complicated and unstable heuristic logic processes for control systems when mitigating large transients. Other benefits include high performance tracking of acceleration rate and operability limits, and improving thrust response in aero-refueling, carrier approach operations or other special missions such as short take-off and vertical landing (STOVL). Commercial advantages include design efficiency improvements that save development costs.

While embodiments of the invention may be implemented in any environment requiring a control system for a gas turbine engine, the multivariable feedforward control system is currently contemplated to be implemented in a jet engine environment. The gas turbine engine may be a turbofan engine, such as a General Electric GEnx or CF6 series engine, commonly used in modern commercial and military aviation or it could be a variety of other known gas turbine engines such as a turboprop or turboshaft. The gas turbine engine may also have an afterburner that burns an additional amount of fuel downstream of the low pressure turbine region to increase the velocity of the exhausted gases, and thereby increasing thrust.

FIG. 1 is a schematic view of an exemplary gas turbine engine 10 that includes a core engine section 12 positioned axially downstream from a fan section 14 along a longitudinal axis 15. The core engine section 12 includes a generally tubular outer casing 16 that defines an annular core engine inlet 18 and that encloses and supports a pressure booster 20 for use in raising the pressure of the air that enters the core engine section 12 to a first pressure level. A high-pressure, multi-stage, axial-flow compressor 22 receives pressurized air from the booster 20 and further increases the pressure of the air. The pressurized air flows to a combustor 24 where fuel is injected into the pressurized air stream to raise the temperature and energy level of the pressurized air. High energy combustion products flow to a first turbine 26 for use in driving the compressor 22 through a first drive shaft 28, and then to a second turbine 30 for use in driving the booster 20 through a second drive shaft 32 that is coaxial with the first drive shaft 28. After driving each of turbines 26 and 30, the combustion products provide propulsive jet thrust by being channeled from the core engine section 12 through an exhaust nozzle 34.

Surrounded by an annular fan casing 38, the fan section 14 includes a rotatable, axial-flow fan rotor 36. The fan casing 38 is supported about the core engine section 12 by a plurality of substantially radially-extending, circumferentially-spaced support struts 40. The fan casing 38 is supported by radially extending outlet guide vanes 42 and encloses the fan rotor 36 and a plurality of fan rotor blades 44. A downstream section 39 of the fan casing 38 extends over an outer portion of the core engine 12 to define a secondary, or bypass, airflow conduit 46 that provides additional propulsive jet thrust.

Transient data demonstrates a strong coupling between control variables. The pressure ratio response often is non-minimum phase and, consequently, it has significant undesired drive downs because conventional MIMO design is based on the assumption that the control references are independent variables. Therefore, to control a gas turbine engine for an aircraft using a feedback-only control system, the system necessarily compromises stability and robustness by increasing the control bandwidth and reducing or decoupling the control references. Errors in the coupling may generate large modeling errors (i.e. large transients due to partial mismatch) and unmodeled dynamics in the dynamic inversion design. Instead, direct feedforward calculation of the engine control bypasses the feedback limitation on bandwidth and directs the effectors to move instantaneously (subject to effector dynamic capability) based on predicted reference changes. The control system will minimize the tracking error if the partials used in the feedforward calculation are close to the actual engine dynamics.

Figure 2:
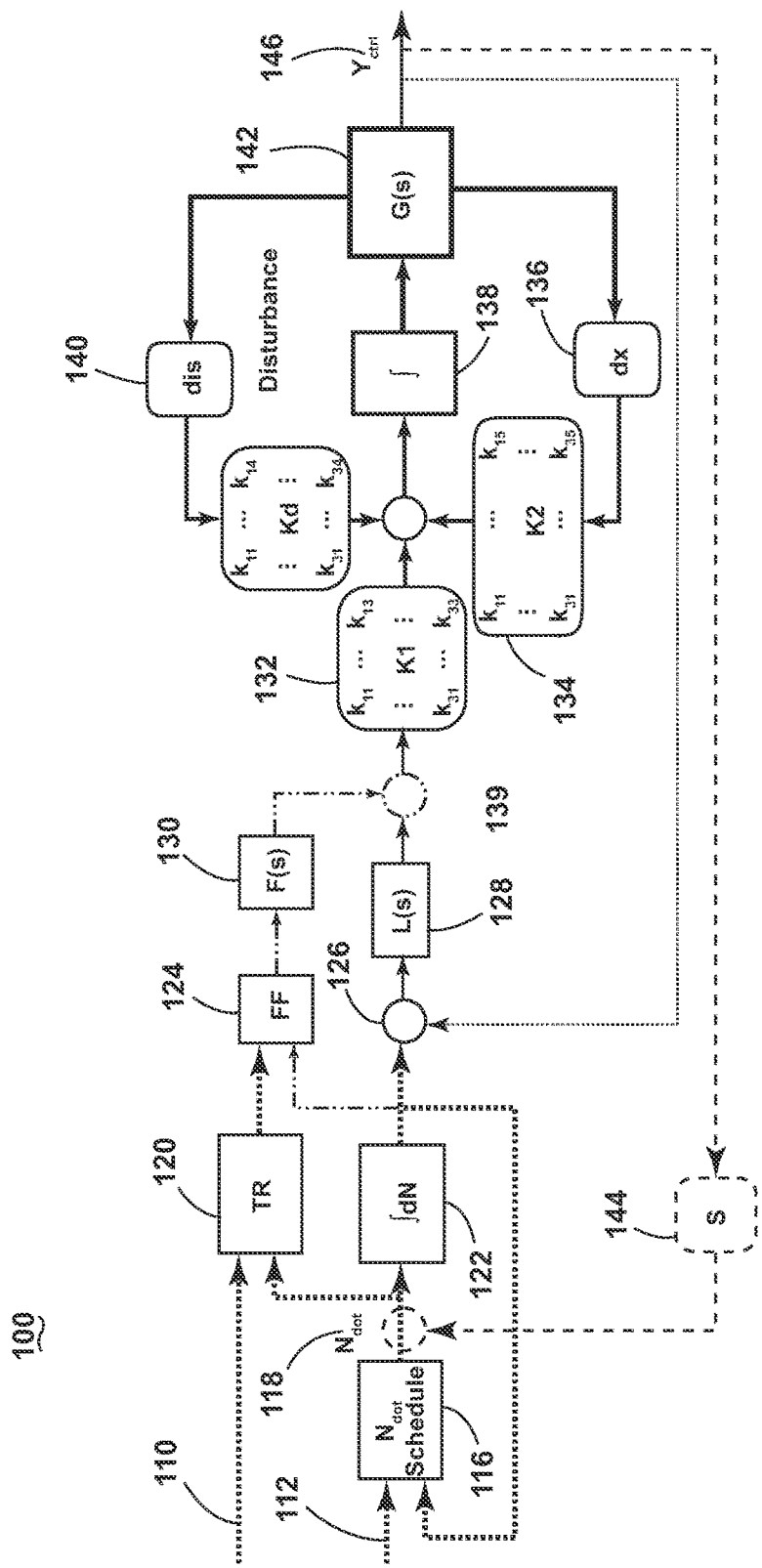
FIG. 2 illustrates a block diagram of the multivariable feedforward control system according to an embodiment.

Referring now to FIG. 2, a block diagram of the multivariable feedforward and feedback control system 100 is shown. Inputs 110, 112 to the control system 100 include sensed values of characteristics of the engine and may include analog or digital representations of observations indicative of the state, operability or environment of the engine. For example, a first input 110 may include a pressure ratio 110 and a second input 112 may include the ambient pressure, P0 and the air temperature prior to the fan T2. According to the control system described herein, the second input 112 are local inputs to the rotor acceleration (Ndot) schedule 116. That is, current values of P0 and T2 determine, in part, the rotor acceleration Ndot 118. In this way, the rotor acceleration schedule 116 breaks a complex, non-linear system element like rotor acceleration into a collection of range-limited subsystems such that a controller may determine and control rotor acceleration 118 by interpolating between the nearest defined subsystems (e.g. groups of values for P0, T2, and sensor outputs 144 of the controlled variable $Y_{ctrl}$ 146 etc).

The rotor acceleration 118 along with the first input 110 (e.g. a pressure ratio) are input to the transient power management schedule, TR 120. In the case of large transient Ndot control, the fan and core rates are calculated based on designed schedules for the second input (e.g. P0 and T2) under large transient throttle conditions along with a pressure ratio reference transient schedule at 120. The rotor acceleration, Ndot 118 is input to an integrator 122. The integrator 122 computes an estimate of the rotor velocity, N to form a speed scheduled trajectory. With both speed and pressure ratio scheduled trajectories and forward predictions, feedforward (FF) 124 is thus calculated based on the desired trajectory. For example, one step first order prediction results in the equation:

$$v_{\mathit{ff}}(k)=(1-\lambda_a)^{-1}T_S^{-1}[y_d(k+1)-y_d(k)-\lambda_a)y_d(k)-y_d(k-1))]$$

where $v_{\mathit{ff}}$ is the calculated feedforward based on pressure ratio trajectory, $y_d$, $\lambda_a$ is the assumed time constant, and $T_S$ is the sampling time.

The feedforward control output at FF 124 is input to the block F(s) 130. The functional block F(s) 130 provides additional dynamic shaping of the feedforward output control from FF 124.

The rotor velocity, N, is summed at block 126 with controlled variable $Y_{ctrl}$ 146. The output of the summing operation at 126 is input to the block L(s) 128. The functional block L(s) at 128 is the multivariable feedback control loop dynamic tuning. Tuning a control loop adjusts the control parameters to optimize the parameters to achieve a desired control response. The outputs of block L(s) and F(s) 130 are input to the summing operation at block 139.

The inputs 110, 112 to the control system (e.g. pressure ratio, P0, and T2) are MIMO inputs that, by dynamic inversion, yield MIMO gains of K1 and K2 matrices, 132 and 134 respectively. Disturbance rejection 140 is included as a feedforward control of the off-scheduling error geometry of the controlled effectors and yield a MIMO gain of the Kd matrix 141. That is, disturbance rejection attenuates the effects of uncontrolled effectors. The gain matrices are integrated at block 138 which is input to the plant dynamics, G(s) at block 142. That is, G(s) at block 142 represents the plant dynamics including both a cycle model and an effector model.

Combining the feedforward and feedback control, the discretized dynamic equations with pressure ratio control become:

$$y_{\mathit{ff}}(k+1) - y_{\mathit{ff}}(k) + y_{\mathit{fb}}(k+1) - y_{\mathit{fb}}(k) =$$
$$CA(x(k) - x(k-1)) + CB_u[u_{\mathit{ff}}(k) - u_{\mathit{ff}}(k-1) + (u_{\mathit{fb}}(k) - u_{\mathit{fb}}(k-1))] +$$
$$(CB_d + D_d)(d(k) - d(k-1))$$

where the response y is a combination of feedforward, $y_{\mathit{ff}}$ and feedback, $y_{\mathit{fb}}$ and the resulting control calculation of $u(k)=u_{\mathit{ff}}(k)+u_{\mathit{fb}}(k)$. C, A, $B_u$ are the linear engine speed, torque, and input partials respectively. $B_d$ and $D_d$ are the open loop scheduled effectors or other modeled disturbance partials, and d(k) represents disturbances generated by the open loop scheduled effectors and other modeled disturbances.

Figure 3:
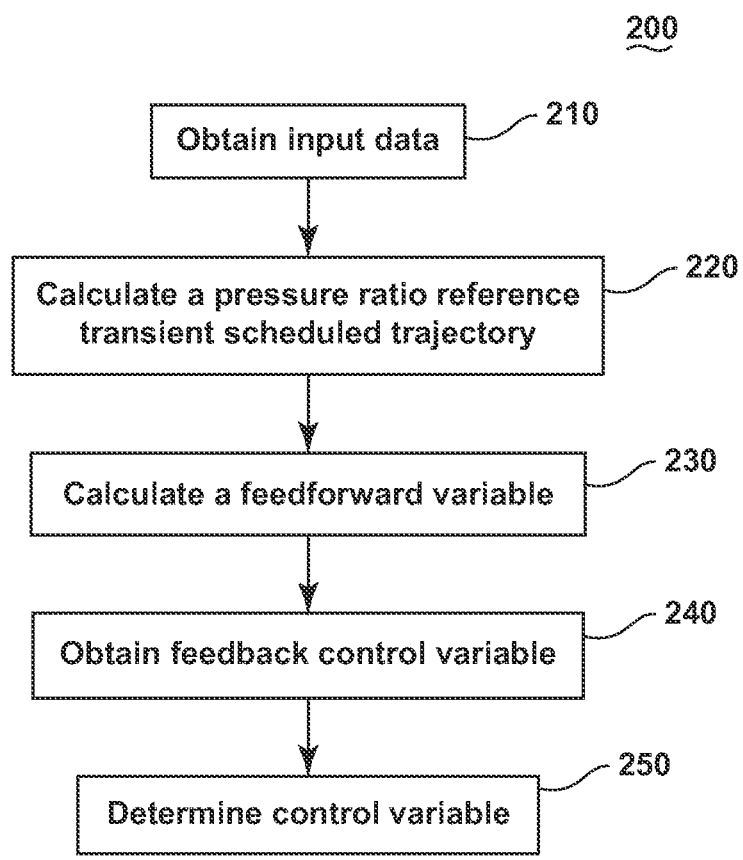
FIG. 3 illustrates a flow chart illustrating a method of tracking variable states of a jet engine with the multivariable feedfoward control system of FIG. 2.

Referring now to FIG. 3, a method 200 of implementing the feedforward and feedback control system is shown. The method 200 tracks variable states of a gas turbine engine in transient conditions. In operation, a computer program on a processor may implement the method. At step 210, the processor obtains input data representative of rotor velocity and pressure ratio. Based on the input data, the processor calculates a pressure ratio reference transient scheduled trajectory at step 220. The processor may additionally calculate other schedules based on available inputs and necessary outputs. For example, the processor may calculate a speed reference transient scheduled trajectory. The processor may then calculate a feedforward variable at step 230 based on the speed reference transient scheduled trajectory and pressure ratio transient scheduled trajectory. The processor then obtains a feedback control variable at step 240 and determines at step 250 a control variable based on a multivariable coupled combination of the feedforward variable and the feedback control variable.

Military engines often require high thrust tracking performance (i.e. bandwidth) to meet the operational requirements for aero-refueling, carrier approach or other special missions such as short take-off and vertical landing (STOVL).

In the background and the preceding description, for the purposes of explanation, numerous specific details are set forth in order to provide a thorough understanding of the technology described herein. It will be evident to one skilled in the art, however, that the exemplary embodiments may be practiced without these specific details. In other instances, structures and devices are shown in diagram form in order to facilitate description of the exemplary embodiments.

The exemplary embodiments are described with reference to the drawings. These drawings illustrate certain details of specific embodiments that implement a module, method, or computer program product described herein. However, the drawings should not be construed as imposing any limitations that may be present in the drawings. The method and computer program product may be provided on any machine-readable media for accomplishing their operations. The embodiments may be implemented using an existing computer processor, or by a special purpose computer processor incorporated for this or another purpose, or by a hardwired system.

As noted above, embodiments described herein may include a computer program product comprising machine-readable media for carrying or having machine-executable instructions or data structures stored thereon. Such machine-readable media can be any available media, which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that can be used to carry or store desired program code in the form of machine-executable instructions or data structures and that can be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general purpose computer, special purpose computer, or special purpose processing machines to perform a certain function or group of functions.

Embodiments will be described in the general context of method steps that may be implemented in one embodiment by a program product including machine-executable instructions, such as program codes, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program codes for executing steps of the method disclosed herein. The particular sequence of such executable instructions or associated data structures represent examples of corresponding acts for implementing the functions described in such steps.

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the internet and may use a wide variety of different communication protocols. Those skilled in the art will appreciate that such network computing environments will typically encompass many types of computer system configurations, including personal computers, hand-held devices, multiprocessor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

An exemplary system for implementing the overall or portions of the exemplary embodiments might include a general purpose computing device in the form of a computer, including a processing unit, a system memory, and a system bus, that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules and other data for the computer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of tracking variable states of a gas turbine engine for controlling the gas turbine engine in transient conditions by a control system, the method comprising:
   obtaining in a processor of a control system input data representative of rotor velocity and pressure ratio in a gas turbine engine;
   calculating via the processor a pressure ratio reference transient scheduled trajectory based on the input data;
   calculating via the processor a speed reference transient scheduled trajectory based on the input data;
   calculating via the processor a feedforward variable based on the speed reference transient scheduled trajectory and pressure ratio transient scheduled trajectory;
   obtaining in the processor a feedback variable; and
   determining via the processor a control variable based on a multivariable coupled combination of the feedforward variable and the feedback variable;
   wherein determining the control variable based on the multivariable coupled combination of the feedforward variable and the feedback variable is calculated by a discretized dynamic equation with pressure ratio control, wherein the discretized dynamic equation comprising feedforward response, feedback response, linear engine speed, torque, input partial, open loop scheduled effectors, disturbances generated by the open loop schedule effectors;
   wherein the control system contemporaneously controls operation of the gas turbine engine based on the control variable.

2. The method of claim 1 further including disturbance rejection to attenuate effects of uncontrolled effectors.

3. The method of claim 1 wherein obtaining input data includes obtaining data representative of pressure and air temperature in the gas turbine engine.

4. The method of claim 3 wherein calculating the speed reference transient scheduled trajectory is based on the pressure and air temperature.

5. The method of claim 1 further comprising dynamically shaping the feedforward variable.

6. The method of claim 1 further comprising summing the rotor velocity input data and the control variable to provide multivariable feedback control loop dynamic tuning as the control system contemporaneously controls operation of the gas turbine engine.

* * * * *